(12) United States Patent
Glickman et al.

(10) Patent No.: US 12,202,437 B2
(45) Date of Patent: Jan. 21, 2025

(54) DEPLOYABLE STEP SYSTEMS FOR MOTOR VEHICLES

(71) Applicant: FORD GLOBAL TECHNOLOGIES, LLC, Dearborn, MI (US)

(72) Inventors: David Brian Glickman, Southfield, MI (US); Dennis Yee, Milford, MI (US); Satvinder Singh Matharu, Tecumseh (CA)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 341 days.

(21) Appl. No.: 17/712,668

(22) Filed: Apr. 4, 2022

(65) Prior Publication Data
US 2023/0311775 A1    Oct. 5, 2023

(51) Int. Cl.
*B60R 3/02* (2006.01)
*B60D 1/01* (2006.01)
*B62D 33/027* (2006.01)

(52) U.S. Cl.
CPC .......... *B60R 3/02* (2013.01); *B60D 1/01* (2013.01); *B62D 33/0273* (2013.01)

(58) Field of Classification Search
CPC .. B60R 3/02; B60R 3/007; B60D 1/01; B62D 33/0273; B62D 33/023; B62D 33/03
See application file for complete search history.

(56) References Cited

U.S. PATENT DOCUMENTS

| | | | | |
|---|---|---|---|---|
| 2,209,576 A | * | 7/1940 | McDonald | B60R 3/02 105/447 |
| 3,623,764 A | * | 11/1971 | Jacobus | E05D 15/52 292/216 |
| 4,974,866 A | * | 12/1990 | Morgan | B60D 1/363 280/477 |
| 5,205,603 A | * | 4/1993 | Burdette, Jr. | B60R 3/02 182/195 |
| 6,581,955 B2 | * | 6/2003 | Aquinto | B60D 1/485 293/106 |
| 6,685,204 B1 | | 2/2004 | Hehr | |
| 6,994,362 B2 | * | 2/2006 | Foster | B60R 3/005 280/166 |
| 7,195,262 B2 | | 3/2007 | Chaudoin et al. | |
| 7,377,563 B1 | | 5/2008 | Demick | |
| 7,434,825 B2 | | 10/2008 | Williams | |
| 7,635,247 B2 | | 12/2009 | Collins | |
| 8,360,455 B2 | | 1/2013 | Leitner et al. | |

(Continued)

FOREIGN PATENT DOCUMENTS

JP    S6317723 Y2 *  5/1988

*Primary Examiner* — James A Shriver, II
*Assistant Examiner* — Michael T. Walsh
(74) *Attorney, Agent, or Firm* — Vichit Chea; Carlson, Gaskey & Olds, P.C.

(57) ABSTRACT

Deployable step systems are disclosed for accessing and utilizing vehicle cargo spaces on vehicles equipped with a tailgate assembly. The proposed deployable step systems may include various deployment mechanisms that are capable of sliding, pivoting, rotating, swinging, and/or otherwise adjusting for providing ease of access and increased flexibility when stepping up to access the vehicle cargo space. The proposed deployable step systems may provide improved access to the vehicle cargo space irrespective of what position the tailgate assembly is positioned in relative to the vehicle cargo space.

20 Claims, 7 Drawing Sheets

(56) References Cited

U.S. PATENT DOCUMENTS

| | | | |
|---|---|---|---|
| 8,827,294 B1* | 9/2014 | Leitner | B60R 3/02 |
| | | | 280/166 |
| 9,434,317 B2 | 9/2016 | Nania | |
| 9,963,076 B1 | 5/2018 | Bender et al. | |
| 10,183,623 B2 | 1/2019 | Krishnan et al. | |
| 11,643,151 B2* | 5/2023 | Nania | B62D 33/0273 |
| | | | 296/51 |
| 2003/0116938 A1* | 6/2003 | Shields | B60R 3/007 |
| | | | 280/166 |
| 2007/0273123 A1* | 11/2007 | Wilson | B60R 3/02 |
| | | | 280/166 |
| 2021/0261060 A1* | 8/2021 | Schwarz | B60D 1/52 |
| 2022/0001728 A1 | 1/2022 | Nania et al. | |
| 2022/0185190 A1* | 6/2022 | Johnson | B60R 3/02 |

* cited by examiner ic # DEPLOYABLE STEP SYSTEMS FOR MOTOR VEHICLES

TECHNICAL FIELD

This disclosure relates generally to motor vehicles, and more particularly to deployable step systems for accessing and utilizing cargo spaces on motor vehicles equipped with a tailgate assembly.

BACKGROUND

Many motor vehicles include cargo spaces for transporting various types of cargo. A pickup truck, for example, includes a cargo bed that establishes the cargo space of the truck. A tailgate typically encloses one end of the cargo bed. The tailgate is movable between closed and open positions for accessing the cargo bed.

SUMMARY

A vehicle according to an exemplary aspect of the present disclosure includes, among other things, a hitch tube, a bumper at least partially supported by the hitch tube, and a deployable step system mounted to at least one of the hitch tube or the bumper. The deployable step system is movable between a stowed position and a first deployed position relative to the bumper. In the stowed position, a step pad of the deployable step system establishes a side pocket bumper step of the bumper. In the first deployed position, the step pad is rearward of the bumper.

In a further non-limiting embodiment of the foregoing vehicle, the hitch tube extends in a cross-width direction of the vehicle and is a component of a vehicle body of the vehicle. A trailer hitch is mounted to the hitch tube.

In a further non-limiting embodiment of either of the foregoing vehicles, the deployable step system is mounted at a location that is outboard of the trailer hitch.

In a further non-limiting embodiment of any of the foregoing vehicles, a mounting bracket of the deployable step system is mounted directly to the hitch tube or to a structure of the bumper.

In a further non-limiting embodiment of any of the foregoing vehicles, the deployable step system includes a base mount rotatably coupled to the mounting bracket via a pivot pin.

In a further non-limiting embodiment of any of the foregoing vehicles, the base mount includes a position wheel having a plurality of openings configured to receive a locking pin of the deployable step system.

In a further non-limiting embodiment of any of the foregoing vehicles, a receiver of the base mount is configured to receive an outer tube of the deployable step system. A mid-tube is slidably received within a passageway of the outer tube.

In a further non-limiting embodiment of any of the foregoing vehicles, an extension of the mid-tube outside of the passageway positions the step pad further rearward of the bumper.

In a further non-limiting embodiment of any of the foregoing vehicles, a step bar of the deployable step system is slidably received within a passageway of the mid-tube.

In a further non-limiting embodiment of any of the foregoing vehicles, the step pad is mounted to the step bar, a pivoting of the step bar relative to the mid-tube positions the step pad vertically lower relative to the bumper.

In a further non-limiting embodiment of any of the foregoing vehicles, the deployable step system is movable from the stowed position to a first deployed position, and then from the first deployed position to a second deployed position, and then from the second deployed position to a third deployed position.

In a further non-limiting embodiment of any of the foregoing vehicles, an outer tube of the deployable step system is rotatable between the stowed position and the first deployed position, and the outer tube is parallel to a longitudinal axis of a bumper when in the stowed position and is traverse to the longitudinal axis when in the first deployed position.

In a further non-limiting embodiment of any of the foregoing vehicles, the deployable step system is movable in a sweeping path along an angular arc to position the step pad in the first deployed position.

In a further non-limiting embodiment of any of the foregoing vehicles, the vehicle is a pickup truck that includes a cargo bed and a tailgate assembly.

In a further non-limiting embodiment of any of the foregoing vehicles, the tailgate assembly includes a door subassembly.

A method according to another exemplary aspect of the present disclosure includes, among other things, moving a deployable step system of a vehicle between a stowed position and a first deployed position. In the stowed position, a step pad of the deployable step system establishes a side pocket bumper step of a bumper of the vehicle. In the first deployed position, the step pad is located rearward from the bumper.

In a further non-limiting embodiment of the foregoing method, the method includes moving the deployable step system from the first deployed position to a second deployed position.

In a further non-limiting embodiment of either of the foregoing methods, in the second deployed position, the step pad is further rearward from the bumper as compared to when in the first deployed position.

In a further non-limiting embodiment of any of the forgoing methods, the method includes moving the deployable step system from the second deployed position to a third deployed position.

In a further non-limiting embodiment of any of the forgoing methods, in the third deployed position, the step pad is closer to a ground surface as compared to when in the first deployed position or the second deployed position.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

Figure 1:
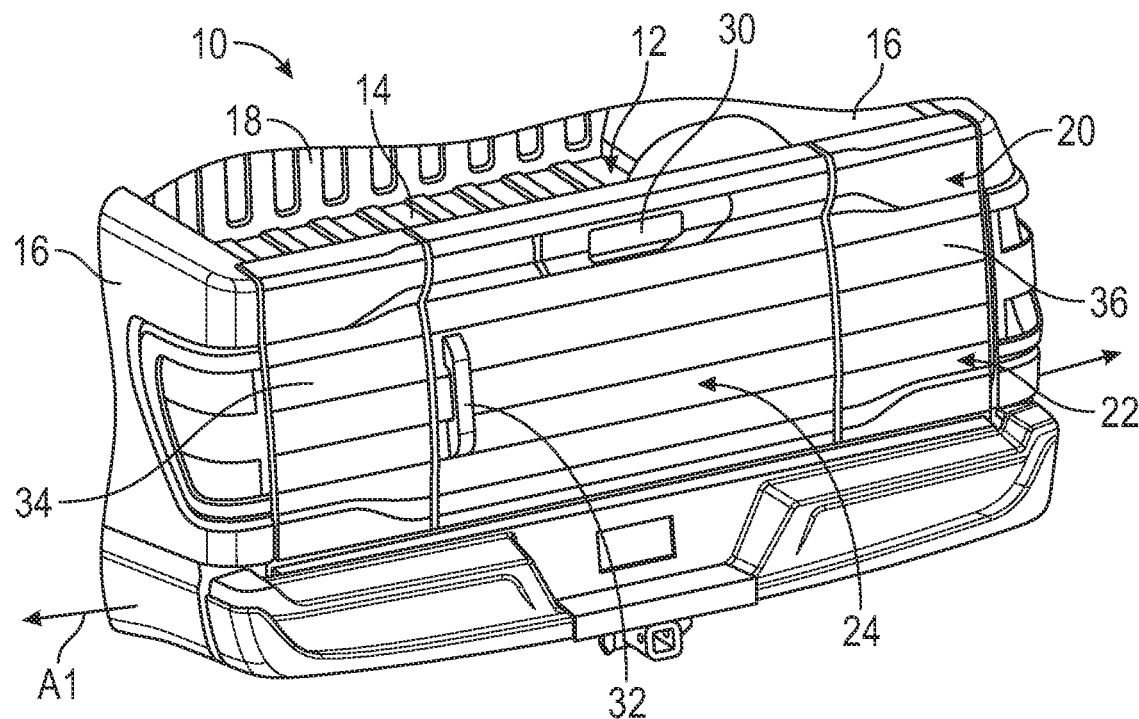
FIG. 1 is a rear perspective view of a motor vehicle equipped with a cargo space and a tailgate assembly positioned in a tailgate closed position relative to the cargo space.

This disclosure details deployable step systems for accessing and utilizing vehicle cargo spaces on vehicles equipped with a tailgate assembly. The proposed deployable step systems may include various deployment mechanisms that are capable of sliding, pivoting, rotating, swinging, and/or otherwise adjusting for providing ease of access and increased flexibility when stepping up to access the vehicle cargo space. The proposed deployable step systems may provide improved access to the vehicle cargo space irrespective of what position the tailgate assembly is positioned in relative to the vehicle cargo space. These and other features of this disclosure are described in greater detail below.

FIGS. 1, 2, 3, and 4 illustrate select portions of a motor vehicle 10 that includes a cargo space for storing and/or hauling one or more items of cargo. In the illustrated embodiment, the vehicle 10 is a pickup truck and the cargo space is established by a cargo bed 12 of the pickup truck. While a pickup truck with a cargo bed is specifically depicted and referenced herein, other vehicles having other types of cargo spaces could also benefit from the teachings of this disclosure. The vehicle 10 could also be a conventional, internal combustion engine powered vehicle, a traction battery powered electric or hybrid vehicle, an autonomous vehicle (i.e., a driverless vehicle), etc.

Although a specific component relationship is illustrated in the figures of this disclosure, the illustrations are not intended to limit this disclosure. The placement and orientation of the various components of the vehicle 10 are shown schematically and could vary within the scope of this disclosure. In addition, the various figures accompanying this disclosure are not necessarily drawn to scale, and some features may be exaggerated or minimized to emphasize certain details of a particular component.

The cargo bed 12 is generally rearward of a passenger cabin (not shown) of the vehicle 10 and includes a floor 14 extending between a pair of longitudinally extending side walls 16, a laterally extending front wall 18, and a tailgate assembly 20. The overall size, shape, and configuration of the cargo bed 12 are not intended to limit this disclosure.

The tailgate assembly 20 could be configured as a one-piece tailgate structure or a multi-sectional tailgate structure. The tailgate assembly 20 may include, among other things, a frame subassembly 22 and, optionally, a door subassembly 24. The door subassembly 24 may sometimes be referred to as a "swing gate subassembly." Although the door subassembly 24 is shown, the teachings of this disclosure are not limited to tailgate assemblies that include swing gate subassemblies. Rather, the teachings of this disclosure could be used with any type of tailgate.

The frame subassembly 22 may include a driver side section 34, a passenger side section 36, and a connection member 38 (see FIG. 3) connected between the driver side section 34 and the passenger side section 36. If provided, the door subassembly 24 may be connected to either the driver side section 34 or the passenger side section 36 by a hinge assembly 35 (see FIG. 3).

Figure 2:
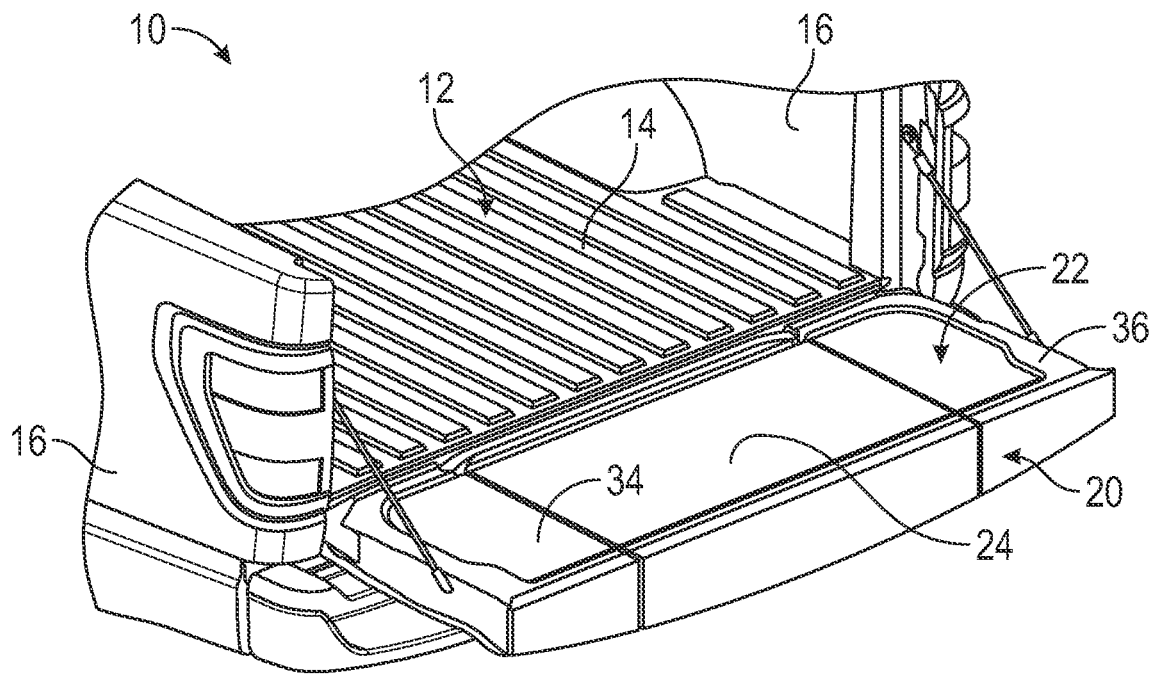
FIG. 2 illustrates the tailgate assembly of FIG. 1 in a tailgate open position.

The tailgate assembly 20 is pivotable about a first axis A1 relative to the cargo bed 12 between a tailgate closed position shown in FIG. 1 and a tailgate open position shown in FIG. 2. The tailgate assembly 20 may be moved from the tailgate closed position to the tailgate open position in response to actuating a first handle 30 of the tailgate assembly 20, for example. The tailgate assembly 20 is vertically aligned when in the tailgate closed position and thus generally encloses an end of the cargo bed 12 that is opposite from the front wall 18, and the tailgate assembly 20 is horizontally aligned when in the tailgate open position and thus generally allows access to the cargo bed 12. Vertical and horizontal, for purposes of this disclosure, are with reference to ground in the ordinary orientation of the vehicle 10 during operation.

If provided, the door subassembly 24 of the tailgate assembly 20 is in a door closed position and is latched to the frame subassembly 22 when the frame subassembly 22 and the door subassembly 24 are pivoted between the tailgate closed position and the tailgate open position. Thus, the frame subassembly 22 and the door subassembly 24 pivot together as a unit when the tailgate assembly 20 is transitioned back and forth between the tailgate closed position and the tailgate open position.

Figure 3:
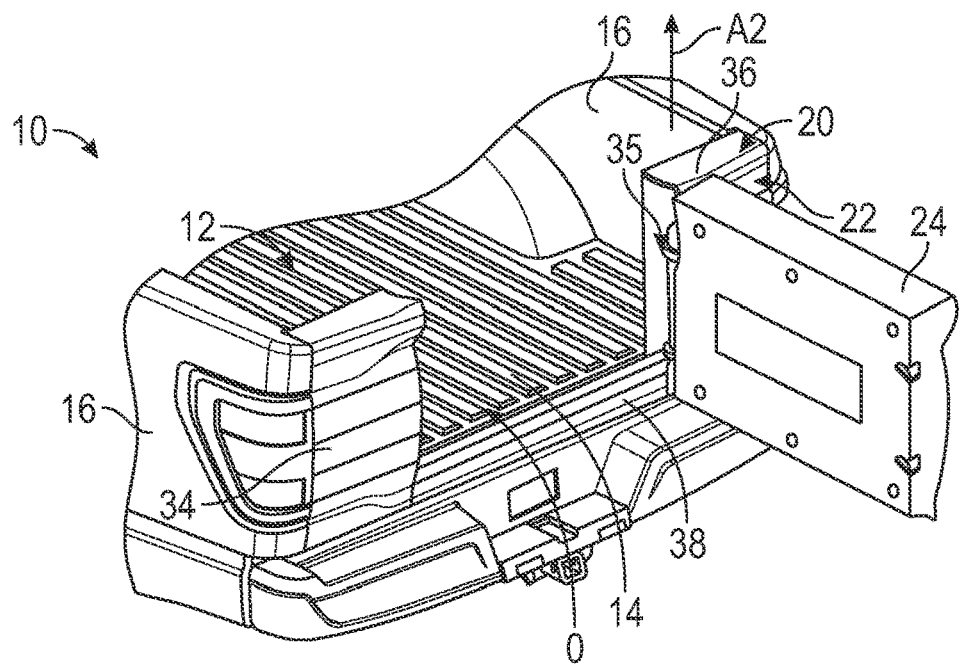
FIG. 3 illustrates a door subassembly of the tailgate assembly of FIG. 1 in a door open position.
Figure 4:
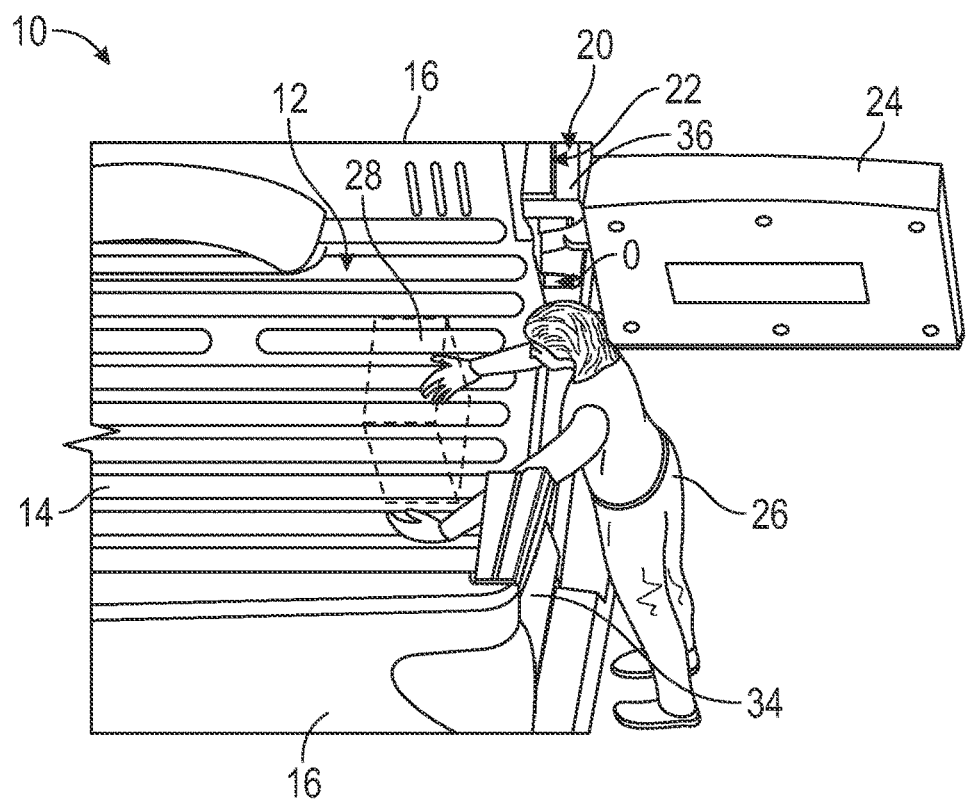
FIG. 4 is a rear and top view of the tailgate assembly and the door subassembly of FIG. 3.

When in the tailgate closed position, the door subassembly 24 may be pivotable relative to the frame subassembly 22 about a second axis A2 between the door closed position shown in FIG. 1 and a door open position shown in FIG. 3. In an embodiment, the first axis A1 is a horizontally extending axis, and the second axis A2 is transverse to the first axis A1 and is thus considered a vertically extending axis. The door subassembly 24 may be moved between the door closed position and the door open position by grasping a second handle 32 (see FIG. 1) of the tailgate assembly 20, for example.

The door subassembly 24 provides a cargo bed access opening O when moved to the door open position. In an embodiment, the cargo bed access opening O extends vertically downward at least as far as the floor 14 of the cargo bed 12. A user 26 (see FIG. 4) can access the cargo bed 12 through the cargo bed access opening O when the door subassembly 24 in positioned in the door open position. Placing the door subassembly 24 in the door open position allows the user 26 to move closer to the cargo bed 12 than, for example, if the tailgate assembly 20 were moved to the tailgate open position of FIG. 2. The cargo bed access opening O can also provide clearance for the user 26 to enter the cargo bed 12 to either load or retrieve an item of cargo 28 (see FIG. 4) without moving the tailgate assembly 20 to the tailgate open position.

The user 26 may periodically require assistance for stepping up and accessing the cargo bed 12 from the ground. This disclosure is therefore directed to systems for enabling improved access to the cargo bed 12 irrespective of whether the tailgate assembly 20 is in the tailgate closed position, the tailgate open position, the door open position, etc.

FIGS. 5, 6, 7, 8, 9, and 10 illustrate a deployable step system 40 that can be utilized on a motor vehicle, such as the vehicle 10 of FIGS. 1-4, for example. The deployable step system 40 may be configured for assisting a user in accessing the cargo bed 12 of the vehicle 10 whether or not the tailgate assembly 20 is in the tailgate closed position shown in FIG. 1, the tailgate open position shown in FIG. 2, or the door open position shown in FIG. 3, thereby providing increased utility.

Figure 5:
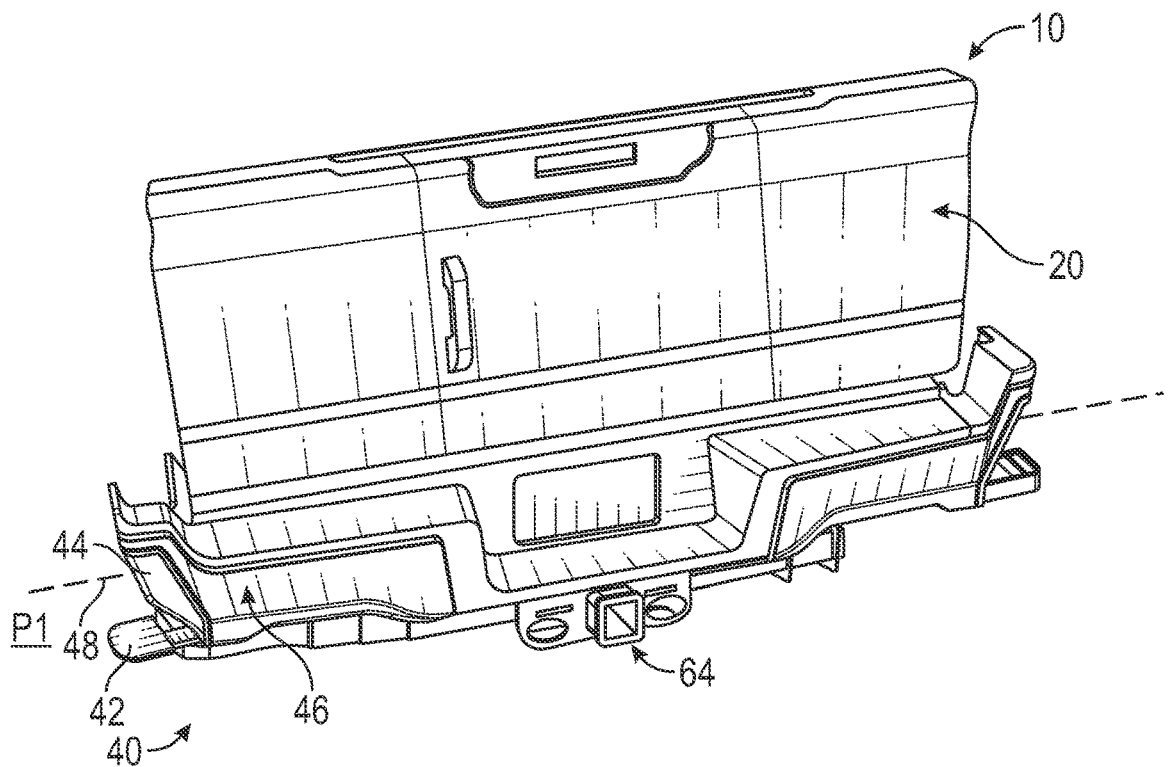
FIG. 5 illustrates a deployable step system for accessing a vehicle cargo space. The deployable step system is shown in a stowed position in FIG. 5.
Figure 6:
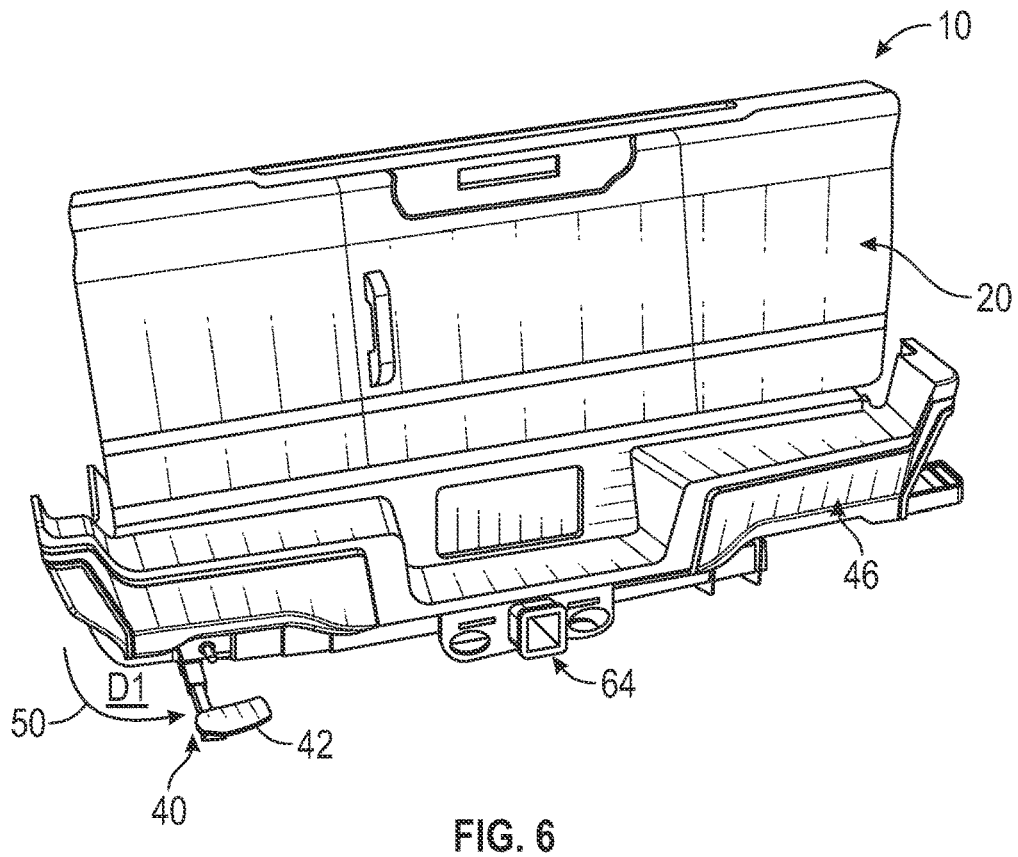
FIG. 6 illustrates an exemplary deployed position of the deployable step system of FIG. 5.
Figure 7:
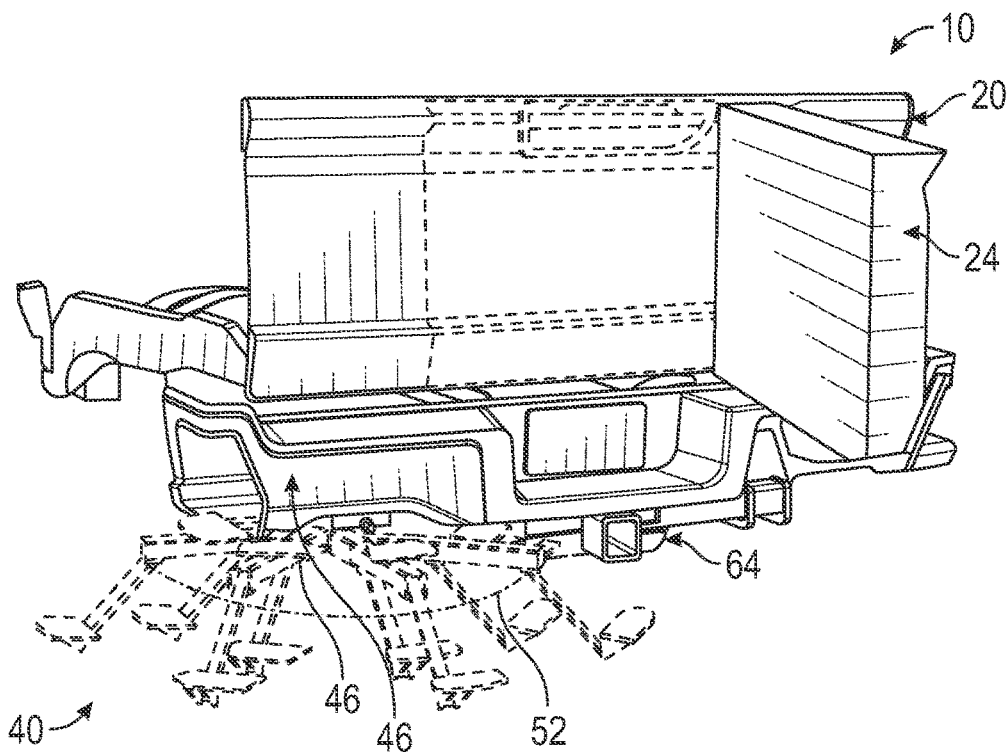
FIG. 7 illustrates a multitude of potential angular positions of a deployable step system.

The deployable step system 40 is movable between a stowed position P1 shown in FIG. 5 and a first deployed position D1 shown in FIG. 6. In an embodiment, one or more subcomponents of the deployable step system 40 may be manually moved for transitioning between the stowed position P1 and the first deployed position D1. However, in other embodiments, the deployable step system 40 may be automatically moved, such as via a motor and a drive tube, cable, or screw, for example, between the stowed position P1 and the first deployed position D1.

In the stowed position P1, a step pad 42 of the deployable step system 40 may be at least partially received within a pocket 44 of a bumper 46 of the vehicle 10. When in this position, the step pad 42 may establish a side pocket bumper step of the vehicle 10. The pocket 44 may be formed at an outboard edge of the bumper 46, for example.

Further, when in the stowed position P1, a majority of the subcomponents of the deployable step system 40 (with the exception of the step pad 42) may be positioned vertically beneath the bumper 46 and extend generally in parallel with a longitudinal axis 48 of the bumper 46.

When activated, the deployable step system 40 may begin to rotate relative to the bumper 46, thereby moving the step pad 42 from the stowed position P1 of FIG. 5 to the first deployed position D1 of FIG. 6. In the first deployed position D1, some subcomponents of the deployable step system 40 may be moved to a position that is transverse relative to the longitudinal axis 48 of the bumper 46, thereby moving the step pad 42 in a direction of arrow 50 to a position that is rearward of the bumper 46.

The deployable step system 40 may be moved in a multitude of angular positions relative to the bumper 46 to achieve a desired angular positioning of the first deployed position D1. For example, the deployable step system 40 may be moved in a sweeping path along an angular arc 52 to position the step pad 42 at various angular positions, some examples of which are illustrated in phantom lines in FIG. 7, although various other positions could also be achieved within the scope of this disclosure. The angular positions may include any position between the pocket 44 and at about a mid-span point of the bumper 46.

Figure 8:
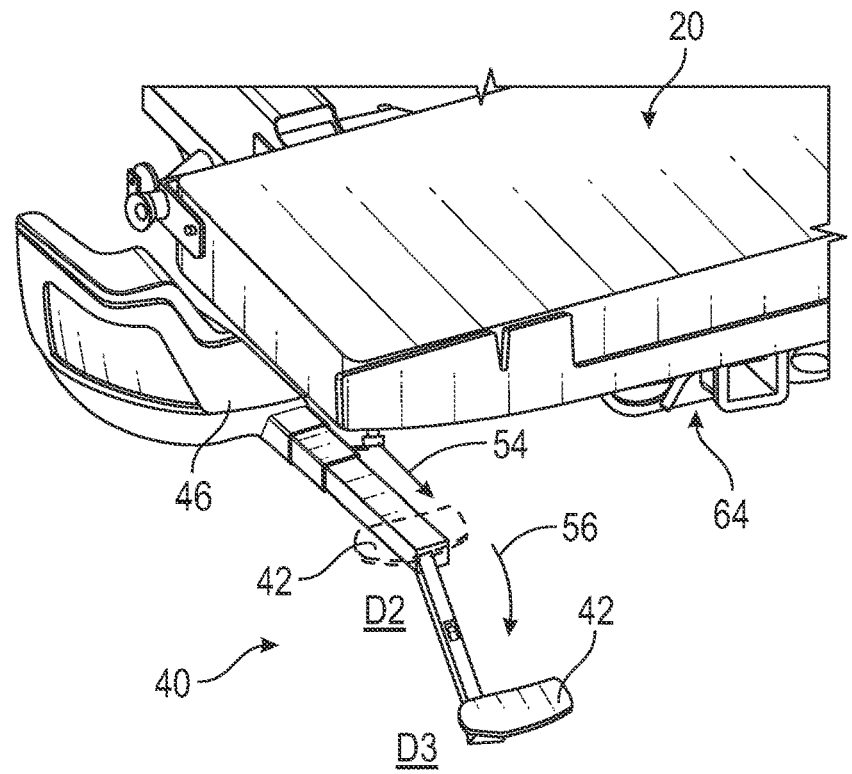
FIG. 8 illustrates a fully deployed position of a deployable step system.
Figure 9:
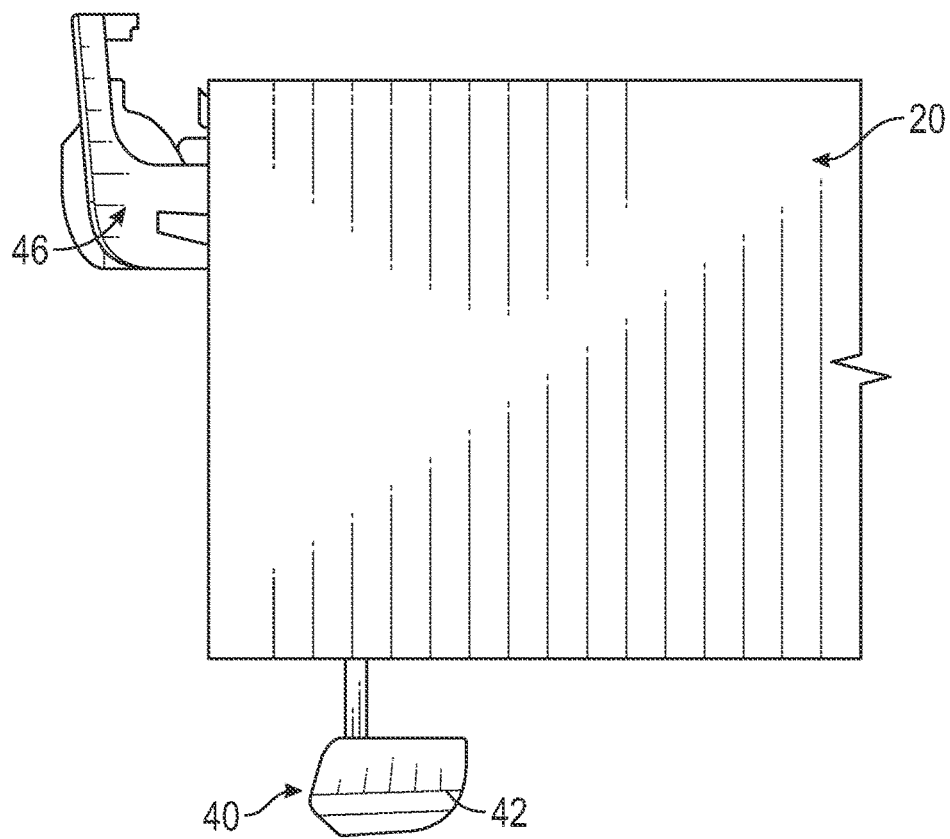
FIG. 9 illustrates a deployed position of a deployable step system with a tailgate assembly in a tailgate open position.

From the first deployed position D1 of FIG. 6, the deployable step system 40 may be further moved to a second deployed position D2 shown in FIG. 8. In the second deployed position D2, the deployable step system 40 may be moved (e.g., translated) in a direction of arrow 54 to position the step pad 42 further rearward from the bumper 46.

From the second deployed position D2, the deployable step system 40 may be further moved (e.g., pivoted) to a third deployed position D3. In the third deployed position, the deployable step system 40 may be pivoted in the direction of arrow 56 to lower the step pad 42 to a position that is closer to the ground. The second and third deployed positions D2, D3 may be particularly useful when the tailgate assembly 20 is positioned in the tailgate open position (see, e.g., FIG. 9).

In some implementations, the deployable step system 40 could be moved from the first deployed position D1 directly to the third deployed position D3 (e.g., without moving the system further rearward from the bumper 46). The deployable step system 40 may be moved in a multitude of angular and pivoted positions relative to the bumper 46 (see FIG. 7) to achieve a desired positioning from any of the positions described above.

Figure 10:
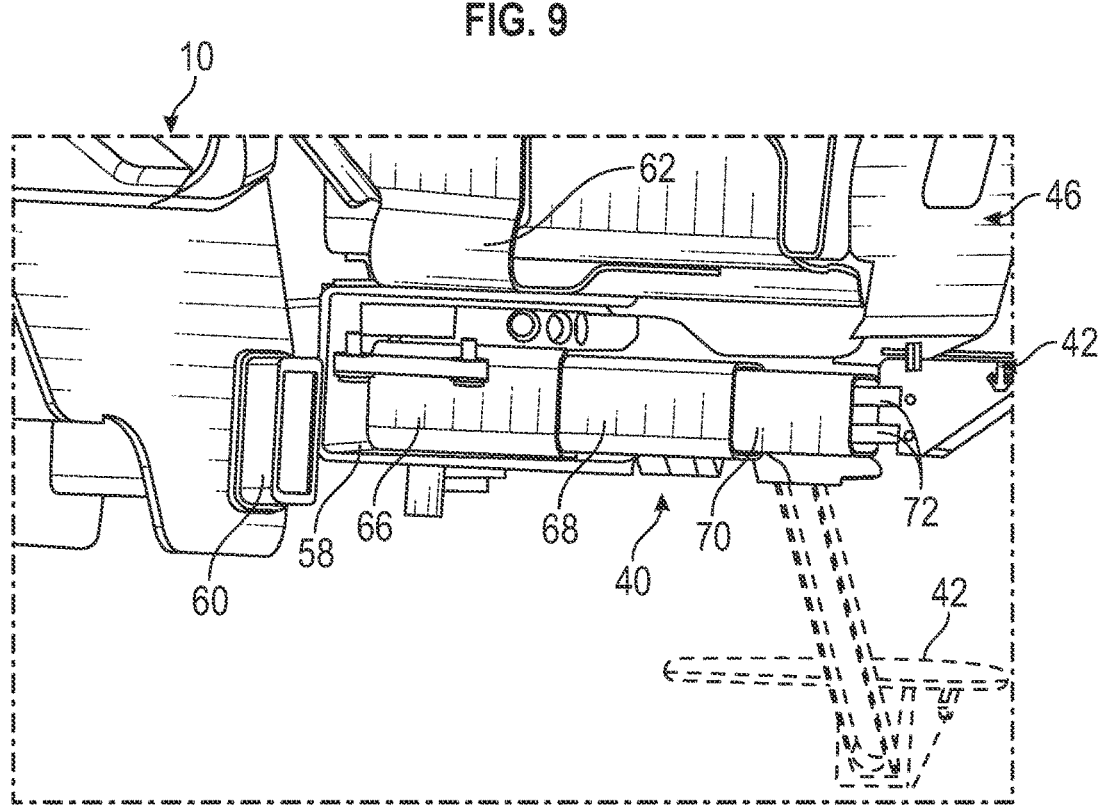
FIG. 10 is a partial bottom view of a vehicle equipped with a deployable step system.
Figure 11:
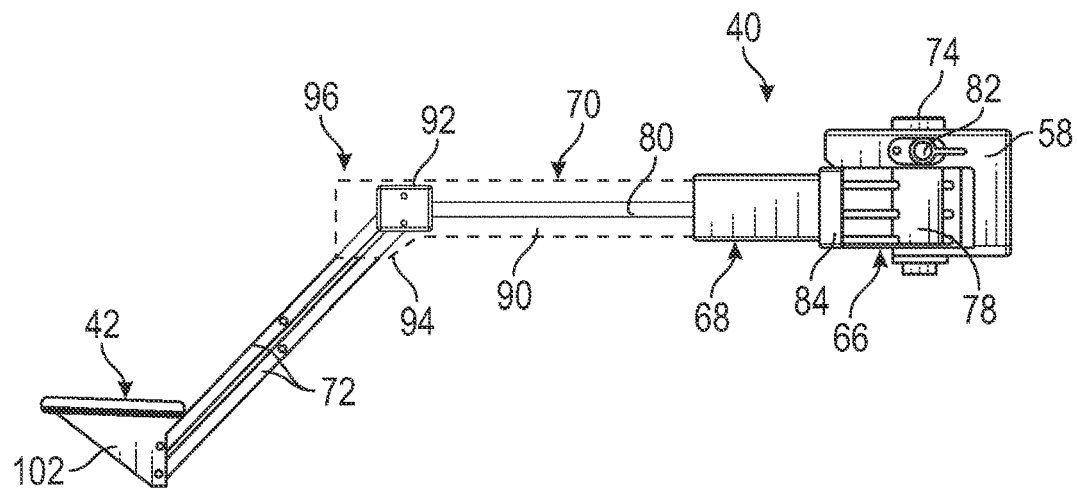
FIG. 11 is a rear view of a deployable step system.
Figure 12:
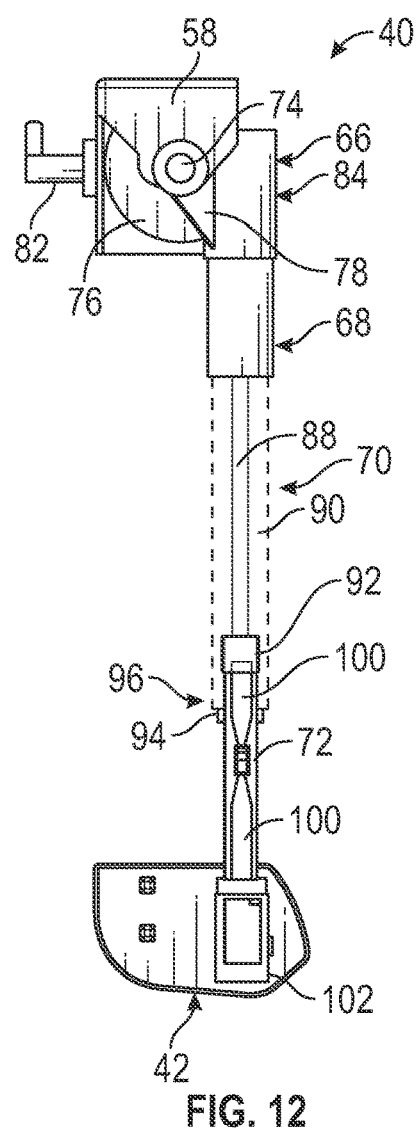
FIG. 12 is a bottom view of the deployable step system of FIG. 11.

Referring now primarily to FIG. 10, the deployable step system 40 may include a mounting bracket 58 for mounting the system 40 to the vehicle 10. The mounting bracket 58 may be mounted (e.g., bolted, welded, etc.) to a hitch tube 60, a structure 62 associated with the bumper 46, or both.

The hitch tube 60 is an integral component of a vehicle body of the vehicle 10 and supports the bumper 46. The hitch tube 60 extends in cross-width direction of the vehicle 10, and in an embodiment, extends across a majority of the width of the vehicle 10. The hitch tube 60 may support a trailer hitch 64 (see FIGS. 5-8) of the vehicle 10. The trailer hitch 64 may provide a receiver tube adapted to receive another trailer component (e.g., a ball mount) for connecting a trailer to the vehicle 10.

The structure 62 may be a bumper supporting bracket or any other suitable structure of the bumper 46. The mounting bracket 58 may be mounted to the hitch tube 60 and/or the structure 62 at a location that is outboard of the trailer hitch 64.

In the illustrated embodiment, the deployable step system 40 is mounted on the driver-side of the vehicle 10. However, the deployable step system 40 could alternatively or additionally be mounted on the passenger-side of the vehicle 10.

FIGS. 11, 12, 13, and 14, with continued reference to FIGS. 5-10, illustrate further features of the deployable step system 40. The deployable step system 40 is shown removed from the vehicle 10 in FIGS. 11-14 for clarity. The deployable step system 40 may include, among various other components, the mounting bracket 58, a base mount 66, an outer tube 68, a mid-tube 70, one or more step bars 72, and the step pad 42.

The base mount 66 may be rotatably supported relative to the mounting bracket 58 via a pivot pin 74. The base mount 66 may therefore rotate relative to the mounting bracket 58 for altering the angular positioning of the deployable step system 40 relative to the bumper 46 of the vehicle 10. The pivot pin 74 may extend though the mounting bracket 58 and through each of a position wheel 76 and an arm mount 78 of the base mount 66 for rotatably supporting the base mount 66 relative to the mounting bracket 58. In an embodiment, the position wheel 76 and the arm mount 78 are integrally formed subcomponents of the base mount 66.

Figure 13:
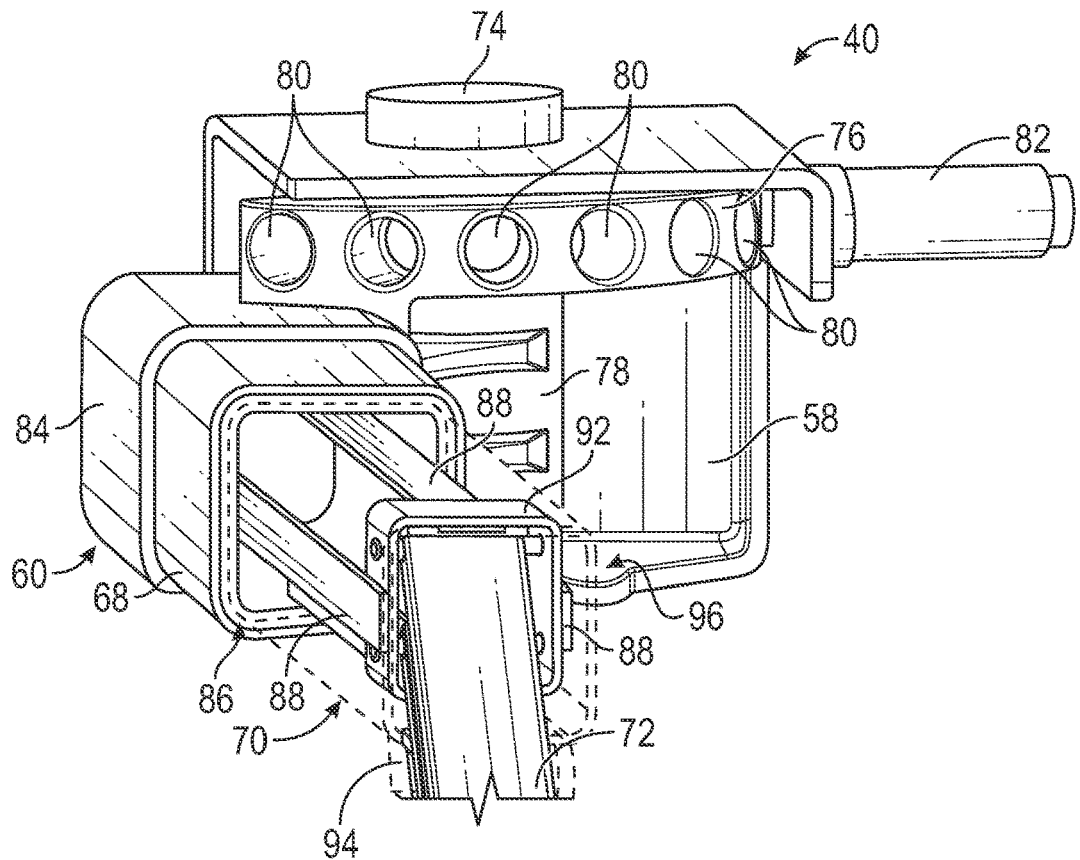
FIG. 13 illustrates select features of the deployable step system of FIGS. 11 and 12.
Figure 14:
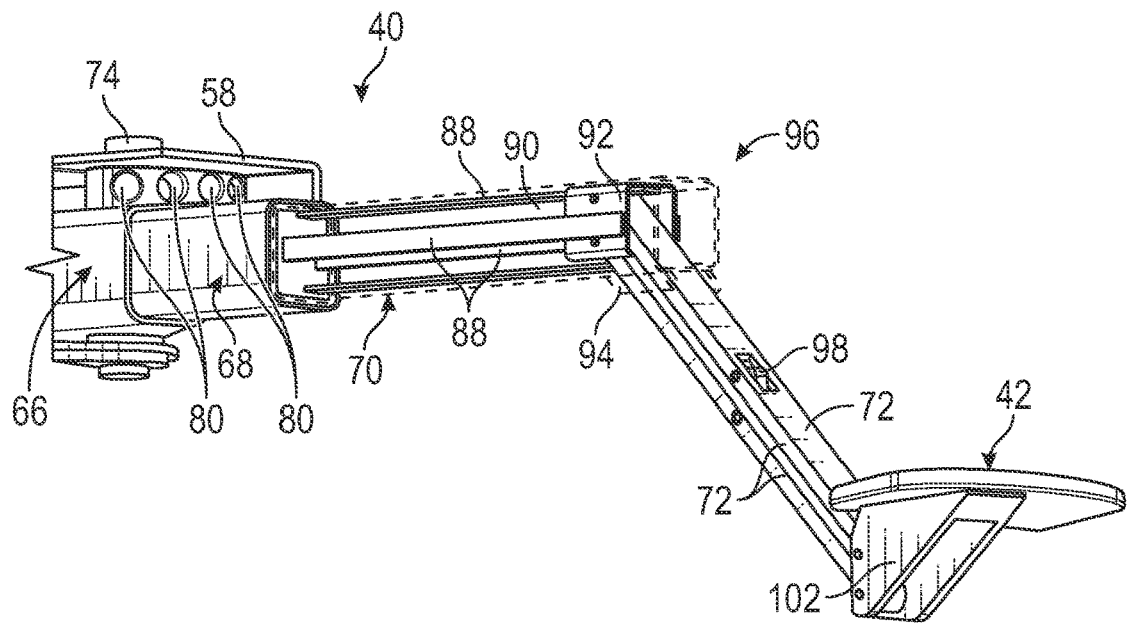
FIG. 14 is a partial perspective view of the deployable step system of FIGS. 11, 12, and 13.

The position wheel 76 may be arc shaped and may include a plurality of openings 80 (best illustrated in FIGS. 13 and 14). Each opening 80 may be sized and shaped to receive a locking pin 82 of the deployable step system 40. The locking pin 82 may be mounted to the mounting bracket 58 and may be removably received within one of the openings 80 for maintaining a desired angular position of the deployable step system 40. When a user desires to change the angular position, the locking pin 82 may be disengaged (e.g., by overcoming a biasing force) from the opening 80 in order to allow the base mount 66 to rotate relative to the mounting bracket 58. The deployable step system 40 may then be moved between the stowed position P1 and the first deployed position D1 (or to any other desired angular position along the angular arc 52). Once the desired angular positioning is achieved, the locking pin 82 may be reinserted into another one of the openings 80 of the position wheel 76 for maintaining the desired angular position.

The base mount 66 may further include a receiver 84 sized and shaped to receive the outer tube 68 of the deployable step system 40. The outer tube 68 may include a passageway 86 (see FIG. 13) that is sized and shaped to receive the mid-tube 70. The mid-tube 70 may be received within the passageway 86 and is movable in a telescoping fashion, such as for moving the deployable step system 40 between the first deployed position D1 and the second deployed position D2.

One or more bushings 88 may be integrated into the mid-tube 70. Portions of FIGS. 11-14 are shown semi-transparent to better illustrate the bushings 88. The bushings 88 may reinforce the mid-tube 70 and provide for improved wear, stability, and durability. The bushings 88 may be made of plastic materials such as ultra-high molecular weight polyethylene or nylon, for example. However, other materials are contemplated within the scope of this disclosure.

The mid-tube 70 may further include a passageway 90 that is sized and shaped to receive the one or more step bars 72 of the deployable step system 40. In an embodiment, two step bars 72 are slidably housed within the mid-tube 70. However, a grater or fewer number of step bars 72 could be provided. The step bars 72 may be received within the passageway 90 and are movable thereto in a telescoping fashion, such as for preparing to move the deployable step system 40 from the first deployed position D1 to the third deployed position D3 for from the second deployed position D2 to the third deployed positions D3.

The step bars 72 may be mounted at one end to a base mounting reinforcement 92. The base mounting reinforcement 92 may be slidably received within the passageway 90 of the mid-tube 70. A stop 94 may be integrated into a distal end portion 96 of the mid-tube 70. The stop 94 is configured to delimit a translation movement of the base mounting reinforcement 92 and thus limits the amount the step bars 72 may be moved outside of the mid-tube 70.

Each step bar 72 may be pivotably coupled to the base mounting reinforcement 92. The step bars 72 may be pivoted downward in a direction toward the ground to position the step pad 42 in the third deployed position D3 when the base mounting reinforcement 92 has been moved to its longitudinal extent relative to the stop 94.

The step bars 72 may be connected together by one or more mid-links 98 (see FIG. 14). The mid-links 98 function to align and stabilize the step bars 72 during their deployment from the mid-tube 70. Each step bar 72 may further include one or more reinforced sections 100 (see FIG. 12) for improving weight efficiency. Although not shown, mounts or bumpers could be provided between the step bars 72 for further aligning and stabilizing the step bars 72 during deployment/when extended.

The step pad 42 may be mounted to the step bars 72 at an opposite end from the base mounting reinforcement 92. The step pad 42 may be mounted to the step bars 72 via a mounting base 102 of the step pad 42. The step pad 42 may provide a step surface for users to step on to gain access to the cargo bed 12 irrespective of the position of the tailgate assembly 20.

The deployable step systems of this disclosure provide solutions for improving access to and utilization of vehicle cargo spaces. The proposed systems provide less complex and more effective stepping solutions for accessing and utilizing the cargo spaces for any and all available tailgate assembly positions.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A vehicle, comprising:
a hitch tube;
a bumper at least partially supported by the hitch tube; and
a deployable step system mounted to at least one of the hitch tube or the bumper and movable between a stowed position and a first deployed position relative to the bumper,
wherein, in the stowed position, a step pad of the deployable step system is at least partially received within a pocket of the bumper to establishes a side pocket bumper step of the bumper,
wherein, in the first deployed position, the step pad is rearward of the bumper.

2. The vehicle as recited in claim 1, wherein the hitch tube extends in cross-width direction of the vehicle and is a component of a vehicle body of the vehicle, and further comprising a trailer hitch mounted to the hitch tube.

3. The vehicle as recited in claim 2, wherein the deployable step system is mounted at a location that is outboard of the trailer hitch.

4. The vehicle as recited in claim 1, wherein a mounting bracket of the deployable step system is mounted directly to the hitch tube or to a structure of the bumper.

5. The vehicle as recited in claim 4, wherein the deployable step system includes a base mount rotatably coupled to the mounting bracket via a pivot pin.

6. The vehicle as recited in claim 5, wherein the base mount includes a position wheel having a plurality of openings configured to receive a locking pin of the deployable step system.

7. The vehicle as recited in claim 5, wherein a receiver of the base mount is configured to receive an outer tube of the deployable step system, and further comprising a mid-tube slidably received within a passageway of the outer tube.

8. The vehicle as recited in claim 7, wherein an extension of the mid-tube outside of the passageway positions the step pad further rearward of the bumper.

9. The vehicle as recited in claim 8, wherein a step bar of the deployable step system is slidably received within a passageway of the mid-tube.

10. The vehicle as recited in claim 9, wherein the step pad is mounted to the step bar, further wherein a pivoting of the step bar relative to the mid-tube positions the step pad vertically lower relative to the bumper.

11. The vehicle as recited in claim 1, wherein the deployable step system is movable from the stowed position to the first deployed position, and then from the first deployed position to a second deployed position, and then from the second deployed position to a third deployed position.

12. The vehicle as recited in claim 1, wherein an outer tube of the deployable step system is rotatable between the stowed position and the first deployed position, and further wherein the outer tube is parallel to a longitudinal axis of a bumper when in the stowed position and is transverse to the longitudinal axis when in the first deployed position.

13. The vehicle as recited in claim 1, wherein the deployable step system is movable in a sweeping path along an angular arc to position the step pad in the first deployed position.

14. The vehicle as recited in claim 1, wherein the vehicle is a pickup truck that includes a cargo bed and a tailgate assembly.

15. The vehicle as recited in claim 14, wherein the tailgate assembly includes a door subassembly.

16. The vehicle as recited in claim 1, wherein the pocket is provided at an outboard edge of the bumper.

17. A method, comprising:
    moving a deployable step system of a vehicle between a stowed position and a first deployed position,
    wherein, in the stowed position, a step pad of the deployable step system is at least partially positioned within a pocket of a bumper of the vehicle to establishes a side pocket bumper step of thea bumper,
    wherein, in the first deployed position, the step pad is located rearward from the bumper.

18. The method as recited in claim 17, comprising moving the deployable step system from the first deployed position to a second deployed position, wherein, in the second deployed position, the step pad is further rearward from the bumper as compared to when in the first deployed position.

19. The method as recited in claim 18, comprising moving the deployable step system from the second deployed position to a third deployed position, wherein, in the third deployed position, the step pad is closer to a ground surface as compared to when in the first deployed position or the second deployed position.

20. A vehicle, comprising:
    a bumper; and
    a deployable step system mounted relative to the bumper and configured to move between a stowed position and a first deployed position relative to the bumper,
    wherein, in the stowed position, a step pad of the deployable step system is at least partially received within a pocket that is located at an outboard edge of the bumper,
    wherein, in the first deployed position, the step pad is displaced from the pocket and is rearward of the bumper.

* * * * *